United States Patent
Jung et al.

(10) Patent No.: US 7,764,976 B2
(45) Date of Patent: Jul. 27, 2010

(54) RADIO COMMUNICATIONS SYSTEM AND METHOD FOR MBMS SERVICE

(75) Inventors: Myung-Cheul Jung, Seoul (KR); Sung-Duck Chun, Anyang (KR); Min-Jung Kim, Ulwang (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/204,603

(22) Filed: Aug. 15, 2005

(65) Prior Publication Data

US 2006/0034225 A1 Feb. 16, 2006

Related U.S. Application Data

(60) Provisional application No. 60/601,641, filed on Aug. 16, 2004.

(30) Foreign Application Priority Data

| Feb. 3, 2005 | (KR) | .......................... 10-2005-10232 |
| Feb. 11, 2005 | (KR) | .......................... 10-2005-11695 |

(51) Int. Cl.
*H04M 1/00* (2006.01)
*H04W 36/00* (2009.01)
*H04W 4/00* (2009.01)

(52) U.S. Cl. ...................... 455/552.1; 455/442; 370/331

(58) Field of Classification Search ................. 370/331; 455/552.1, 436, 442

See application file for complete search history.

(56) References Cited

U.S. PATENT DOCUMENTS 7,206,578 B2 * 4/2007 Narasimha ............... 455/435.2
7,212,824 B2 * 5/2007 Terry ........................... 455/450
7,283,782 B2 * 10/2007 Sinnarajah et al. ......... 455/3.01

(Continued)

FOREIGN PATENT DOCUMENTS

| KR | 10-2005-0073494 A | 7/2005 |
| WO | 03/098842 | 11/2003 |
| WO | 2004/017580 | 2/2004 |
| WO | WO 2004/017580 A1 | 2/2004 |
| WO | WO 2004032552 A1 * | 4/2004 |

OTHER PUBLICATIONS

Samsung; 3GPP TSG-RAN WG3 #41_BIS; "Channel Type Indication Considering CELL_DCH UEs"; Mar. 2004; Tdoc R3-040630.
3GPP TSG-RAN WG3 #42; "Channel Type Indication Over Iur"; May 2004; Tdoc R3-040768.

*Primary Examiner*—George Eng
*Assistant Examiner*—Christopher M Brandt
(74) *Attorney, Agent, or Firm*—Lee, Hong, Degerman, Kang & Waimey (57) ABSTRACT

Provided is a radio communication system and method for a multimedia broadcast and multicast (MBMS) service in which when a terminal having set a dedicated channel in an SRNC moves and is then connected to an RNC by which an MBMS service can be supported, the RNC to which the terminal has moved notifies the terminal whether the MBMS service is available, and accordingly the terminal can select a desirable service (i.e., a previous service or the MBMS service) according to a state thereof on the basis of the corresponding information, whereby it is possible to solve the problem in the conventional art in which the terminal can not receive information of its desirable service and thus can not receive the service, by providing the terminal that can not receive both two dedicated channels (i.e., does not have sufficient capability) with information of a new service.

10 Claims, 5 Drawing Sheets

U.S. PATENT DOCUMENTS

| | | | |
|---|---|---|---|
| 7,286,826 B2* | 10/2007 | Kim et al. | 455/444 |
| 2003/0193911 A1* | 10/2003 | Zhao et al. | 370/331 |
| 2004/0008646 A1* | 1/2004 | Park et al. | 370/331 |
| 2004/0147266 A1* | 7/2004 | Hwang et al. | 455/445 |
| 2004/0180680 A1* | 9/2004 | Beckmann et al. | 455/503 |
| 2004/0266448 A1* | 12/2004 | Kato et al. | 455/450 |
| 2005/0041608 A1* | 2/2005 | Jeong et al. | 370/310 |
| 2005/0063339 A1* | 3/2005 | Jeong et al. | 370/331 |
| 2005/0147127 A1* | 7/2005 | Putcha et al. | 370/480 |
| 2006/0154627 A1* | 7/2006 | Wang et al. | 455/130 |
| 2006/0156370 A1* | 7/2006 | Parantainen | 725/132 |
| 2006/0171359 A1* | 8/2006 | Schwarz | 370/331 |

* cited by examiner

RADIO COMMUNICATIONS SYSTEM AND METHOD FOR MBMS SERVICE

CROSS REFERENCE TO RELATED APPLICATIONS

The present application claims the benefit of earlier filing date and right of priority of U.S. provisional application No. 60/601,641 filed on Aug. 16, 2004, Korean patent application number 10-2005-10232 filed on Feb. 3, 2005, and Korean patent application number 10-2005-11695 filed on Feb. 11, 2005, the contents of which are hereby incorporated by reference herein in their entirety.

BACKGROUND OF THE INVENTION

1. Field of the Invention

The present invention relates to a radio communications system and method for a multimedia broadcast and multicast (MBMS) service, and particularly, to a signaling transmission method for receiving an MBMS service notification.

2. Description of the Background Art

A universal mobile telecommunications system (UMTS) is a third generation mobile communications system that has evolved from a specification known as the European Global System for Mobile communications (GSM) system which aims to provide an improved mobile communications service based on a GSM core network and a wideband code division multiple access (W-CDMA) technology.

Figure 1:
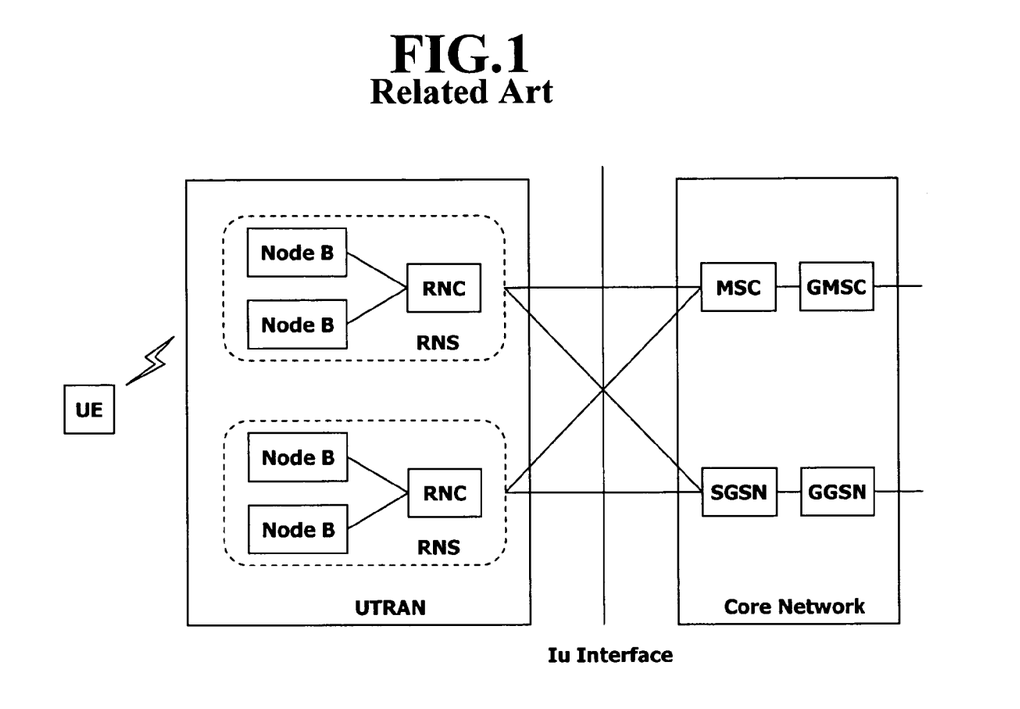
FIG. 1 illustrates a network structure of a UMTS system to which the conventional art and the present invention are applied.

FIG. 1 illustrates a network structure of a UMTS system to which the conventional art and the present invention are applied.

As illustrated in the drawing, the UMTS system is broadly comprised of a terminal (or user equipment: UE), a UTRAN and a Core Network (CN). The UTRAN includes more than one Radio Network Sub-system (RNS), each of which includes a single Radio Network Controller (RNC) and more than one Node B managed by the RNC. The RNC manages the Node B which serves as an access point of the UTRAN for the terminal by receiving information transmitted from a physical layer of the terminal over an uplink and transmitting data to the terminal over a downlink. The RNC allocates and manages radio resources, and serves as an access point of the CN.

Figure 2:
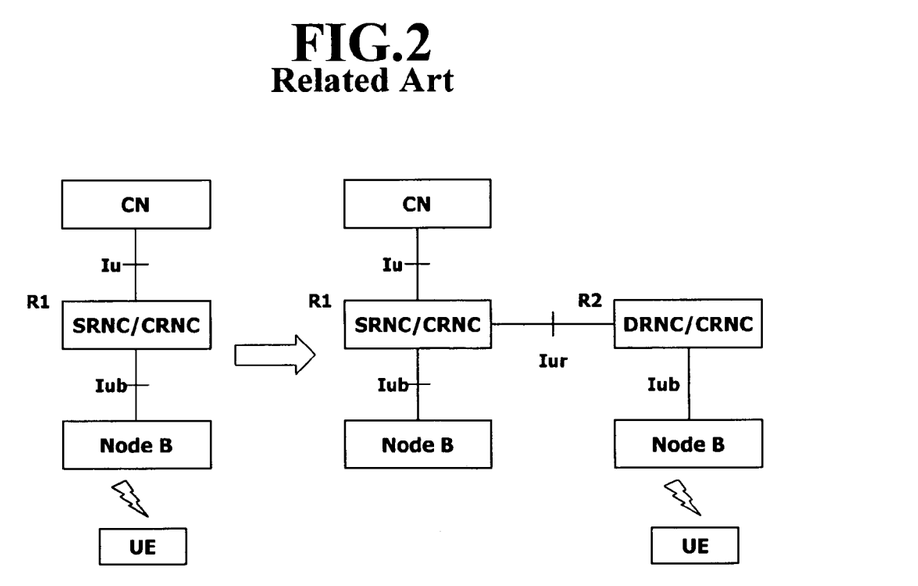
FIG. 2 illustrates a connection structure between a UTRAN and a terminal within a UMTS network.

FIG. 2 illustrates a connection structure between the UTRAN and the terminal within the UMTS network.

Referring to FIG. 2, the terminal is connected with the CN to thusly receive services provided from the UMTS, and information of the terminal and the CN is transmitted via the UTRAN. The CN is connected to the RNC through an Iu interface so as to transmit and receive data and control messages. Each terminal connected to the UMTS network is managed by a specific RNC within the UTRAN. A Serving RNC (SRNC) is the RNC for managing terminals. In other words, the SRNC refers to the RNC which serves as the access point with the CN for transmitting data to a specific terminal. The SRNC performs as a second layer of an Open System Interface (OSI) for data coming through a radio interface or being transmitted to the terminal, and allocates radio resources appropriate to provide services. The function of managing radio resources performed by the SRNC includes control functions associated with the specific terminal such as functions of setting transport channels, determining a handover, performing an Open Loop Power Control, and so on. The terminal connected to the CN through the UTRAN at a specific time point has only one SRNC.

In general, one RNC is used between the terminal and the CN. However, if the terminal moves to an area managed by another RNC, the terminal is connected to the SRNC via the RNC of the corresponding area.

The terminal is initially connected to the CN through an R1 (RRC1). However, if the terminal moves to an area (cell) managed by an R2 (RAN2), the terminal is connected to the R1 through an Iur interface via the R2. In this case, the R1 manages the terminal and serves as an access point with the CN, and the R2 partially performs functions of simply routing user data or allocating common resources. In the UMTS network, every RNC such as the R2 connected to the terminal other than the SRNC is referred to as a Drift RNC (DRNC). Thus, one terminal may have no DRNC or may have one or several DRNCs according to the connection state thereof.

The SRNC and the DRNC are logically divided with relation to a specific terminal. However, the RNC and the Node B within the UTRAN have a subordinate relation therebetween, and accordingly the RNC can be divided at the side of the Node B. That is, in order to distinguish between the RNC for managing the Node B itself and other RNCs, an RNC for managing a specific Node B is referred to as a Controlling RNC (CRNC). Namely, the RNC which is connected to the Node B via an Iub and controls radio resources of the Node B, corresponds to the CRNC of the corresponding Node B, and has a one-to-many relation between the CRNC and the Node B in the structure of the UTRAN. The CRNC performs functions such as load control and congestion control of traffic within a cell that the CRNC itself manages, acceptance control for a new radio link set within this cell and a code allocation.

A Radio Resource Control (RRC) layer is defined at a third layer of a radio protocol located in the RNC and the terminal. The RRC handles the controlling of transport channels and physical channels related to establishment, reconfiguration, and release of Radio Bearers (RBs). In this case, the RB denotes the services provided by a second layer of the radio protocol for data transmissions between the terminal and the RNC. In general, establishing the RB denotes the processes of stipulating the characteristics of a protocol layer and a channel, which are required for providing a specific service, and setting the respective detailed parameters and operation methods thereof.

An RRC state of the terminal and an RRC connection method will now be explained.

The RRC state refers to whether the RRC of the terminal is logically connected to (forms a logical connection with) the RRC of the UTRAN. If the RRC of the terminal forms the logical connection with the RRC of the UTRAN, this is referred to as an RRC connected state. Conversely, if there is no logical connection therebetween, this is referred to as an RRC idle state. If the terminal is in the RRC connected state, and accordingly the UTRAN can recognize the existence of the corresponding terminal according to units of cells, thereby effectively controlling the terminal. On the other hand, the UTRAN can not recognize a terminal that is in idle state. The terminal in idle state can be managed by the CN according to units of location areas or units of routing areas which are areas greater than the cell. That is, the existence of a terminal in idle state is only recognized according to units of large areas (location areas or routing areas), and the terminal must change into the connected state in order to receive typical mobile communication services such as voice or data.

Figure 3:
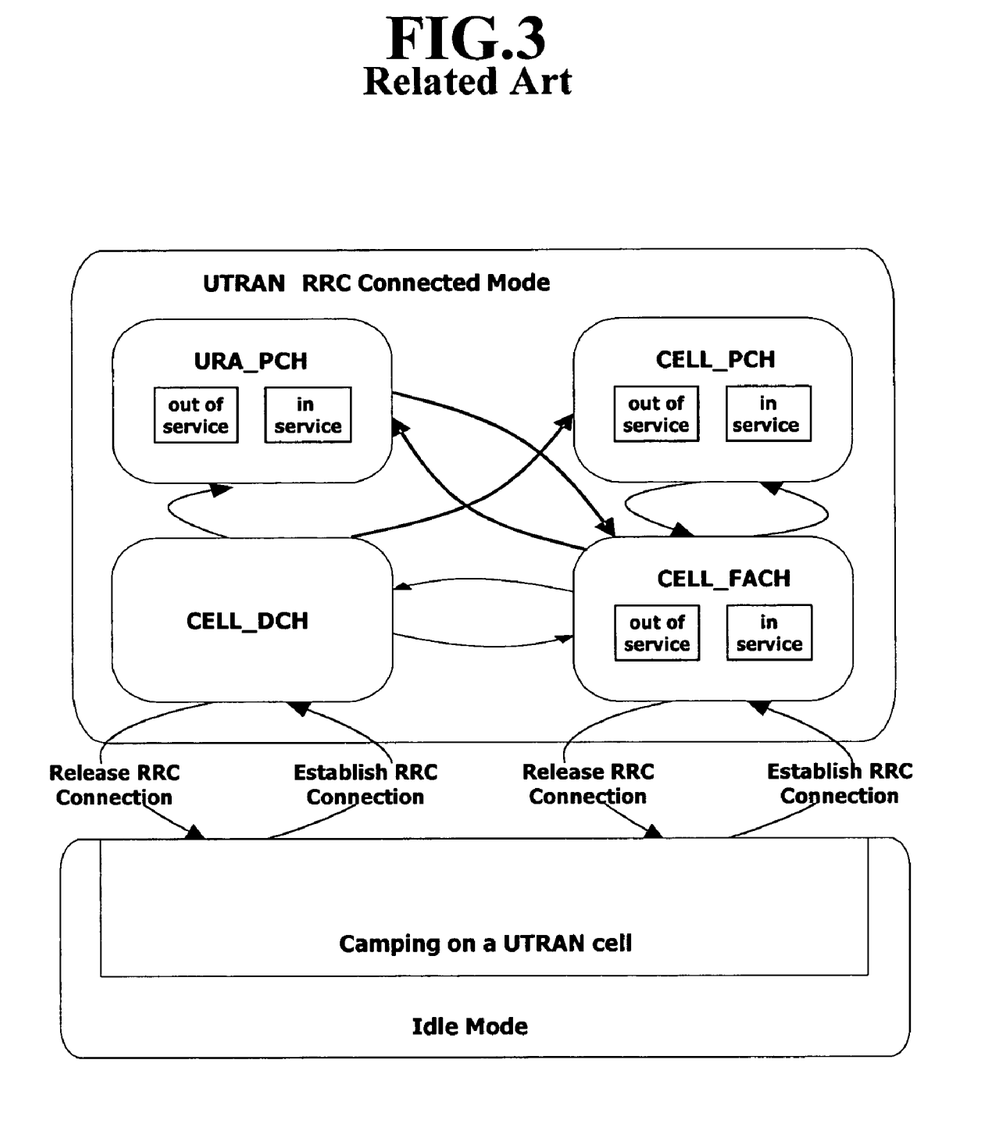
FIG. 3 illustrates an RRC state transition of a terminal.

FIG. 3 is a diagram illustrating an RRC state transition of the terminal.

As illustrated in FIG. 3, when a user turns on the power of the terminal, the terminal first detects an appropriate cell and maintains its idle state in the corresponding cell. The terminal in idle state forms an RRC connection with the RRC of the UTRAN through the RRC connection procedure and is then transited into the RRC connected state when the RRC connection needs to be formed. There are several cases that the terminal in idle state is required to form the RRC connection. For instance, there may be such cases that an uplink data transmission is required due to a call attempt by a user, or when the transmission of a response message in response to a paging message received from the UTRAN is required.

Hereinafter, a Multimedia Broadcast/Multicast Service (MBMS) will now be described.

The MBMS refers to a service for providing streaming or background services to a plurality of terminals using a downlink dedicated MBMS bearer service. In the UTRAN, the MBMS bearer uses a point-to-multipoint radio bearer (RB) and a point-to-point RB.

The MBMS is divided into a broadcast mode and a multicast mode. The MBMS broadcast mode is a service for transmitting multimedia data to all users within a broadcast area. Here, the broadcast area refers to a region where the broadcast service is possible. Conversely, the MBMS multicast mode is a service for transmitting the multimedia data only to a specific user group within a multicast area. Here, the multicast area refers to a region where the multicast service is possible. The multimedia area and broadcast area are referred to as a service area.

Figure 4:
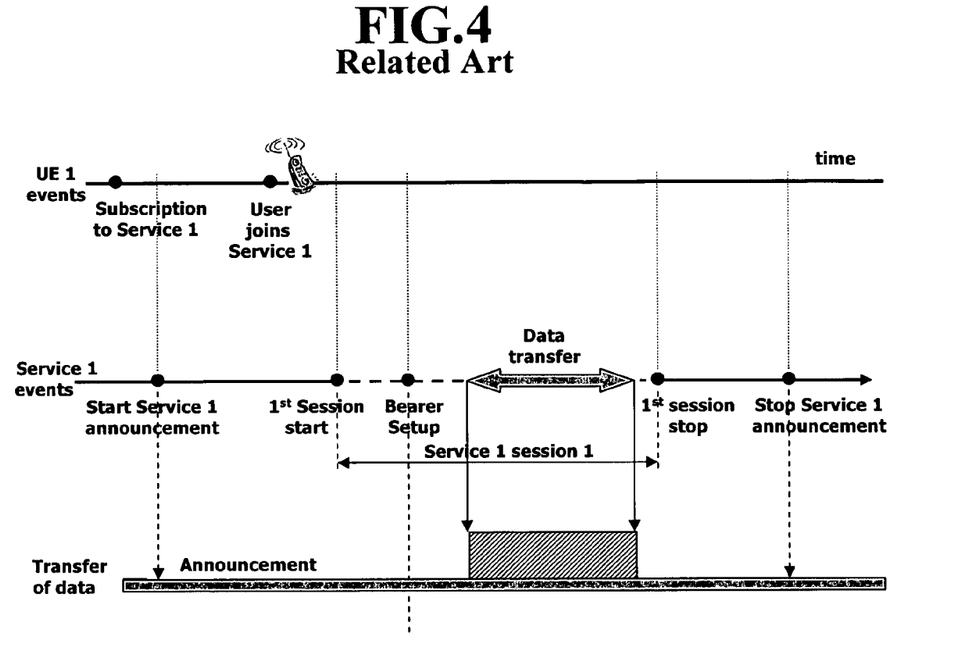
FIG. 4 illustrates an embodiment in which a UMTS network provides a specific MBMS service to a UE using a multicast mode.

FIG. 4 shows a procedure for providing a specific MBMS service (service 1) from a UMTS network to a terminal (UE) by using a multicast mode.

A UE1 that wants to receive an MBMS service subscribes to the service 1 (Subscription). Here, subscribing refers to establishing a relationship between a service provider and a user. Terminals to desirably receive the MBMS service should receive a service announcement provided by the network. Here, the service announcement refers to providing to the terminal an index and any related information of the services to be provided. In particular, a terminal to desirably receive the MBMS service of the multicast mode should join a multicast group. Here, the multicast group refers to a group of terminals receiving a specific multicast service, and joining refers to one user merging with the other users in a multicast group who congregates to receive the particular multicast service. The terminal can inform the UMTS network that it desires to receive specific multicast data through MBMS multicast joining. On the contrary, a procedure that a terminal having joined a specific multicast group releases its joining with respect to the multicast group is referred to as leaving. Each terminal performs such subscribing, joining and leaving processes. The terminal can perform the subscribing, joining, and leaving processes at various times, such as before data transmission, during the transmission, or after the transmission.

While a specific MBMS service is ongoing, one or more sessions can sequentially be generated with respect to the corresponding service. If data to be transmitted for the specific MBMS service is generated in an MBMS service source, the CN notifies a session starting to the RNC. On the contrary, when there is no more data to be transmitted for the specific MBMS service in the MBMS service source, the CN notifies a session stop to the RNC. The data transmission with respect to the specific MBMS service can be carried out between the session starting and the session stop. At this time, the data transmitted through the data transmission process can be transmitted only to the terminals having joined the multicast group for the specific MBMS service.

In the session starting process, the RNC having received the session starting from the CN transfers an MBMS notification to the terminals. Here, the MBMS notification refers to the RNC informing a terminal that the data transmission of the specific MBMS service in a cell draws near (is impending). The MBMS notification is transmitted more than one time before actual data of the service is transmitted. When carrying out the MBMS notification process, the UTRAN may also count the number of terminals receiving the specific MBMS service within one specific cell. The counting procedure is used for determining whether a point-to-multipoint RB or a point-to-point RB should be set as the RB for transmitting the specific MBMS service, or whether no RB should be set.

The RNC internally establishes a threshold value to select an appropriate MBMS RB. After the RNC counts the number of terminals, if the counted number of terminals existing within the corresponding cell is smaller than the threshold value, the RNC establishes the point-to-point RB, while the point-to-multipoint RB is established, if the counted number of terminals is greater than the threshold value. Thus, after determining the MBMS RB, the RNC informs the terminals of the establishment information of the corresponding RB. When the point-to-point RB is established for the specific service, the terminals desirably receiving the service are all in the RRC connected mode state. However, when the point-to-multipoint RB is established for the specific service, all terminals desirably receiving the service do not have to be in the RRC connected mode state. That is, terminals in an idle state can also receive the MBMS service data by using the point-to-multipoint RB. However, if there is no terminal counted which desires to receive the specific MBMS service, the RNC does not establish any RB and does not transmit the MBMS service data. That is why the establishing of an RB by the RNC, even if there is no user who wants to receive the service, causes undesirable consumption of radio resources. When MBMS service data is transmitted from the CN during one session of the MBMS service, the RNC initiates data transmission using the established RB, and releases the pre-established RB when the CN transmits a session stopping message.

The MBMS service area refers to an area configured with cells supporting MBMS services to which a specific terminal has subscribed. The MBMS service area is constructed by combining more than one cell, and may be constructed with cells managed by one RNC or be located over areas managed by several RNCs. A list of neighboring cell information refers to a list including information of cells managed by the DRNC which is positioned adjacent to the RNC.

Figure 5:
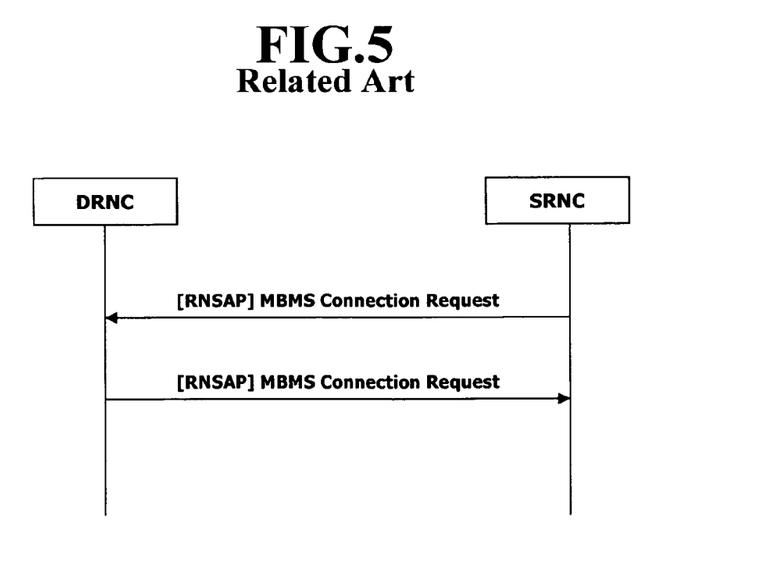
FIG. 5 illustrates an MBMS attaching procedure.

FIG. 5 illustrates an MBMS attaching procedure.

Referring to the drawing, the RNC providing MBMS services recognizes and manages a terminal in the RRC connected mode state among terminals having joined a specific MBMS service for every cell that the RNC itself manages. For this, the RNC makes a list of terminals in the RRC connected mode (RRC connected mode terminal list) for each MBMS service of each cell. The RRC connected mode terminal list includes identifiers (URNTI) of the terminals having joined the specific MBMS service.

In such MBMS attaching procedure, among the MBMS services that the terminal in the RRC connected mode state has joined, for ongoing MBMS services, when the terminal has moved from a cell managed by the SRNC into a cell managed by the DRNC, and for MBMS services which are not ongoing, when the terminal has moved from the cell managed by the SRNC to the cell managed by the DRNC and thereafter the SRNC receives a session starting message from the CN with respect to the corresponding MBMS services, the SRNC transmits terminal information to the DRNC through an MBMS connection (attachment) request message, such that the DRNC adds terminals (which request the MBMS connection) to the RRC connected mode terminal list which the DRNC itself manages with respect to the MBMS services. At this time, the MBMS connection request message includes an ID of a cell to which the terminal has moved, IDs of MBMS services that the terminal is joining, the URNTI of the terminal, and the like.

Once receiving the MBMS connection (attachment) request message for a specific terminal from the SRNC, if it is possible to allocate resources for maintaining the RRC connected mode state with respect to the corresponding terminal, the DRNC grants the MBMS connection request of the terminal. The DRNC then adds the URNTI of the corresponding terminal to the RRC connected mode terminal list for the MBMS services in which the terminal having moved has joined.

Afterwards, the DRNC transmits a positive response to the SRNC through an MBMS connection response message. The SRNC having received the message continuously maintains the terminal in the RRC connected mode state even in the moved cell. The SRNC also transmits the MBMS service data to the terminal using a point-to-point RB. That is, the MBMS service data is transmitted to the DRNC through the SRNC and then transmitted to the terminal through the DRNC using the point-to-point RB.

The DRNC does not always grant the MBMS connection request when receiving the MBMS connection request message for the specific terminal from the SRNC. If the DRNC forms the RRC connection for the terminal but there are no resources for maintaining the terminal in the RRC connected mode state, the DRNC denies the MBMS connection request of the terminal and transmits a negative response to the SRNC.

However, in the conventional art, if the terminal located outside each MBMS service area is connected to the DRNC, there may occur the following problems.

In general, when the terminal positioned in another service area or outside the MBMS service area is connected to the DRNC positioned in a service area in which a service subscribed by the terminal can be supported, the corresponding terminal receives an MBMS notification of the DRNC to which the terminal has moved, and obtains information of the corresponding service. Thereafter, when the service is initiated, the corresponding terminal can receive the corresponding service.

However, for the terminal which is receiving data from the SRNC through a dedicated channel, the terminal can not simultaneously receive the MBMS Control Channel (MCCH) and the Dedicated Control Channel (DCCH) due to a lack of its capabilities. If the MCCH of the DRNC can not be read, because the terminal can not know the type of service provided from the DRNC, the terminal can not receive MBMS services even if the DRNC transmits the MBMS services to which the terminal itself has subscribed.

BREIF DESCRIPTION OF THE INVENTION

Therefore, an object of the present invention is to provide a radio communication system and method for a multimedia broadcast/multicast (MBMS) service capable of selecting whether or not to establish and release a channel for a service that a terminal desires to receive in a new cell by informing the terminal which has moved to the new cell of information with respect to a new service.

To achieve these and other advantages and in accordance with the purpose of the present invention, as embodied and broadly described herein, there is provided a radio communication method comprising: when a terminal which receives a first service at a first RNC moves to be connected to a second RNC for providing a second service, informing the first RNC of information of the second service by the second RNC; notifying the terminal of the information of the second service by the first RNC; and selecting a service that the terminal desires to receive according to the information of the second service and its capability.

Preferably, the first RNC is a Serving RNC (SRNC), and the second RNC is a Drift RNC (DRNC).

Preferably, when the first service is a dedicated channel service, the second service is an MBMS service, and when the first service is the MBMS service, the second service is the dedicated channel service.

Preferably, the information of the second service is a service ID or a list of service IDs. The information of the second service refers to every service that the DRNC can provide, a specific service subscribed by the terminal and whether a service is simply available.

Preferably, the information of the second service is transferred to the first RNC through a service indication message, and transferred to the terminal through a service notification message. In this case, the service indication message is a radio link setup/reconfigure response message and an attach response message.

To achieve these and other advantages and in accordance with the purpose of the present invention, as embodied and broadly described herein, there is provided a radio communication method in a system for setting radio resources for a specific service by a terminal request, the method comprising: when a terminal which receives a first service from a first RNC moves to be connected to a second RNC providing a second service; informing the first RNC and the terminal of information of the second service by the second RNC; and selecting a service that the terminal desires according to the information of the second service and its capability.

Preferably, the first RNC is a Serving RNC (SRNC), and the second RNC is a Drift RNC (DRNC).

Preferably, when the first service is a dedicated channel service, the second service is an MBMS service, and when the first service is the MBMS service, the second service is the dedicated channel service.

Preferably, the information of the second service is a service ID or a list of service IDs.

Preferably, the information of the second service refers to every service that the DRNC can provide, a specific service subscribed by the terminal and whether a service is simply available.

Preferably, the information of the second service is transferred to the first RNC through a service indication message, and transferred to the terminal through a service notification message.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

The present invention may be implemented in a mobile communication system such as a Universal Mobile Telecommunications System (UMTS) developed by the 3GPP. However, the present invention may be applied to communications system operated according to other specifications. Hereinafter, preferred embodiments of the present invention will now be explained in detail.

In general, a terminal may not receive MCCH information simultaneously in a state of receiving a service from an SRNC through a dedicated channel. In this case, the terminal can not receive a specific MBMS service even if the corresponding MBMS service subscribed by the terminal itself is being provided in a cell that a DRNC manages. Therefore, the present invention aims to inform the terminal that the specific MBMS service subscribed by the terminal is being provided in the cell that the DRNC manages.

That is, the present invention proposes a radio communication system and method in which a system informs a terminal of a state of a specific service for supporting mobility of the terminal and efficiently using radio resources. In particular, the present invention proposes a radio communication system and method for a multimedia broadcast/multicast (MBMS) service capable of informing an SRNC and a terminal that a service can be supported by a DRNC when the SRNC processes an MBMS connection procedure toward the DRNC, in a radio system for transmitting MBMS services to a plurality of terminals through a downlink channel.

If a terminal, which is receiving a service from a specific SRNC through a dedicated channel but positioned beyond (outside) an MBMS service area so that it is impossible to receive an MBMS service, is connected to the DRNC belonging to the MBMS service area to be able to receive the MBMS service, the terminal must set a link so as to receive an MBMS notification for the corresponding service. In this case, according to the present invention, the terminal and the RNC (SRNC) is informed that a setup for both a preset dedicated channel (DCCH) and a common channel (MCCH) for a service notification is possible, so that the terminal can set and release its desirable radio link.

There are two examples as methods for supporting the aforementioned concept according to a state of an SRNC, each of which will now be explained.

1. When SRNC does not Support MBMS Service

In this case, the SRNC is an RNC by which an R6 MBMS can not be supported. Here, the terminal is receiving a service by setting a dedicated channel through the SRNC. Because the SRNC does not support the MBMS, even if the terminal requests a subscription to the MBMS service, it is impossible for the terminal to subscribe thereto. In this state, if the terminal moves to be connected to a DRNC capable of supporting the service, the terminal must set a dedicated channel (DCCH) for obtaining information of the corresponding service from the DRNC.

2. When SRNC Supports MBMS Service

In this case, the SRNC is an RNC capable of supporting the R6 MBMS. Here, the terminal is in a state in which it can receive MBMS services which can be supported in a current cell among several MBMS services to which the terminal has subscribed as well as receiving a service through a dedicated channel in an RRC connected state, and can not receive MBMS services which are not supported in the current cell. Afterwards, when the terminal moves, the SRNC requests an MBMS attachment (connection) to the DRNC. If there are MBMS services that the DRNC can support among MBMS services to which the terminal has subscribed, the terminal must set a common channel (MCCH) in the DRNC for obtaining information of the corresponding MBMS services.

Figure 6:
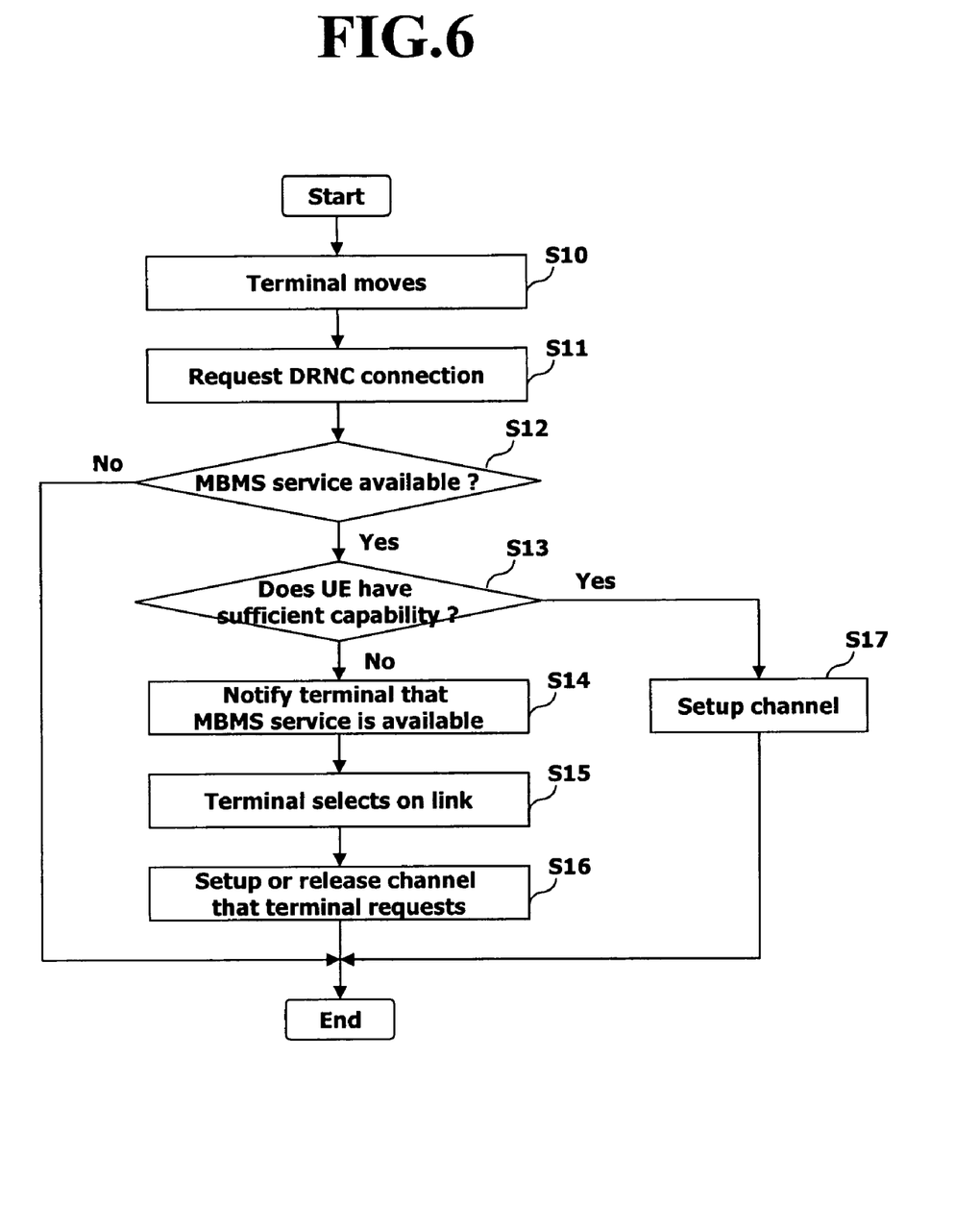
FIG. 6 is a flowchart illustrating a signaling transmission method for an MBMS service according to the present invention.

FIG. 6 is a flowchart illustrating a signaling transmission method for receiving an MBMS service notification according to the present invention.

As illustrated in FIG. 6, once the terminal moves, the SRNC requests the MBMS attachment (connection) to the DRNC (S10 and S11). The DRNC having received the request for the MBMS attachment (connection) checks whether there is an MBMS service that the DRNC itself can support among MBMS services to which the terminal has subscribed (S12). If there exists the MBMS service that the DRNC can support, the DRNC checks whether the terminal has a sufficient capability for the corresponding service (S13). That is, in this step, with respect to the two cases in which it must be performed to set channels in the DRNC, it is checked whether or not the setting of two dedicated channels (DCCH of the SRNC and the MCCH of the DRNC) is impossible due to a lack of capability of the terminal.

If it is impossible to set two channels due to the lack of the capability of the terminal, the DRNC notifies the SRNC that the MBMS service can be supported (i.e., of MBMS service available information) (S14). If the capability of the terminal is sufficient, the DRNC sets the two channels (DCCH of the SRNC and MCCH of the DRNC) (S17).

Therefore, the SRNC requests the terminal to select a certain link on the basis of the MBMS service available information, and the terminal requests the SRNC to release the connection, if necessary, according to the selected information. That is, the DRNC notifies the SRNC that the MBMS service can be supported, and the SRNC informs the terminal of the corresponding condition through a dedicated channel (S15 and S16). This information can be transferred by using a Radio Link Setup/Reconfigure Response message or an Attach Response message.

In FIG. 6, the DRNC first checks whether the UE capability is sufficient to set channels, and thereafter notifies the SRNC (or the terminal) whether the MBMS service can be supported. However, it is not limited thereto, but rather the DRNC sends to the terminal information of a previous service and whether or not the MBMS service can be supported. As a result, the terminal can set and release the corresponding channels.

In general, when the terminal moves from the SRNC to the DRNC, information of the MBMS service to which the terminal has subscribed is transferred from the SRNC to the DRNC through such MBMS attaching procedure. According to this, the DRNC to which the terminal has moved can recognize information about what types of MBMS services the terminal has subscribed to. The DRNC then transmits information of an MBMS service which the DRNC itself can provide to the SRNC. The information of the MBMS service that the DRNC transmits the SRNC may be every MBMS service that the DRNC can provide, or specific MBMS services that the terminal has subscribed to among MBMS services that the DRNC provides.

Further, the information of the MBMS service that the DRNC transmits to the SRNC may be one specific MBMS service, or the very fact that the MBMS service can be supported.

The SRNC having received the information of the MBMS service that the DRNC can provide may notify the terminal, using a dedicated channel, that the specific MBMS service or several MBMS services can be supported by the DRNC, or notify the very fact that the MBMS service can be supported.

Figure 7:
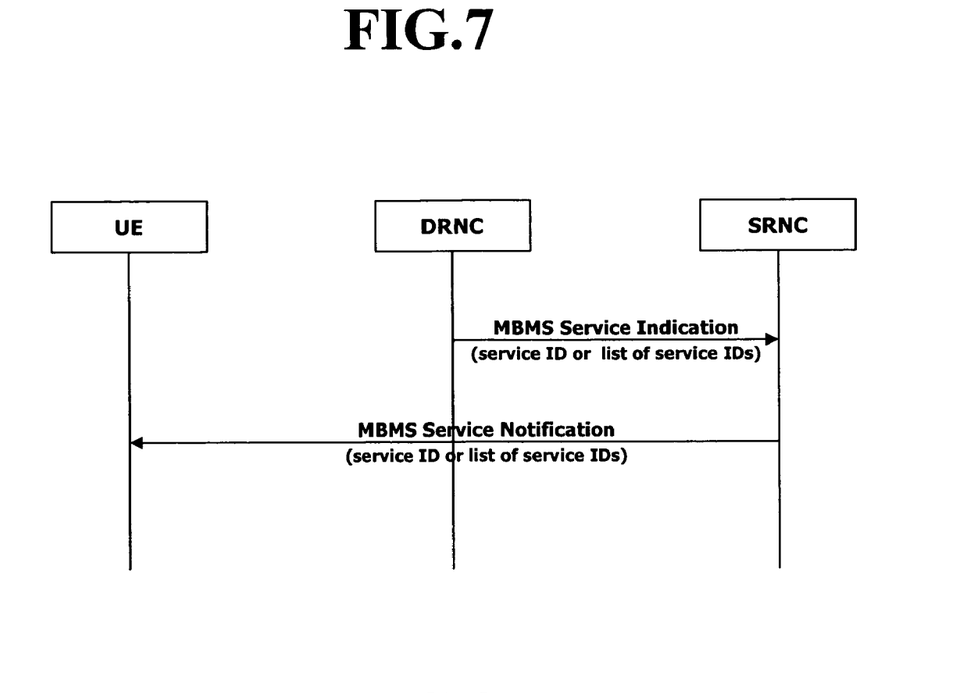
FIG. 7 illustrates an embodiment in which a DRNC informs an SRNC and a terminal of a state of a specific service.

FIG. 7 illustrates one embodiment in which the DRNC notifies the SRNC and the terminal of the state of a specific service.

Referring to FIG. 7, the DRNC transfers to the SRNC the MBMS service information or information about the types of MBMS services through an MBMS service indication message. The MBMS service information may be information of the MBMS service that the DRNC can support or information about what types of MBMS services the DRNC can support among the MBMS services in which the terminal has subscribed to, or the MBMS service available information.

The SRNC having received the MBMS service type information can recognize that the specific MBMS service to which the terminal managed by the SRNC itself has subscribed can be supported by the DRNC. The SRNC notifies the terminal using a dedicated channel that the MBMS service can be supported by the DRNC. At this time, the MBMS service indication message can be an MBMS attachment, a radio link setup, a radio link reconfiguration, or the like.

Figure 8:
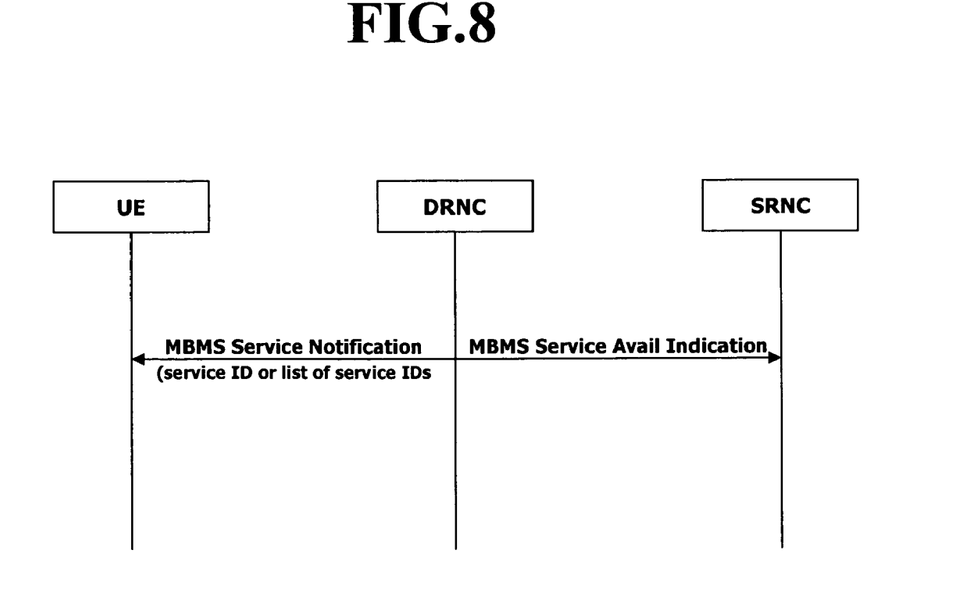
FIG. 8 illustrates an embodiment in which a DRNC informs a terminal of a state of a specific service.

FIG. 8 illustrates another embodiment in which the DRNC notifies the SRNC and the terminal of the state of a specific service.

As illustrated in FIG. 8, the DRNC notifies the SRNC using an MBMS service avail indication message that the MBMS service can be supported by the DRNC. The MBMS service avail indication message is used to notify that the MBMS service subscribed to by the terminal having moved from the SRNC to the DRNC is not supported by the SRNC but supported by the DRNC, or used to notify the SRNC that the MBMS service can be supported by the DRNC. The SRNC having received the MBMS service available indication message can notify the terminal through a dedicated channel that the MBMS service can be supported.

Accordingly, the terminal can selectively maintain the dedicated channel, and can receive the MBMS service after releasing the dedicated channel and checking the MBMS service type from the DRNC using the MBMS service indication message. The MBMS service indication message can be transferred directly to the terminal through the MCCH of the DRNC.

Furthermore, in the present description, merely for convenient explanation, it is only considered that the terminal first receives a dedicated channel service, and after moving, additionally receives the MBMS service. However, the features of the present invention are not limited thereto but rather, it may be possible that the terminal first receives the MBMS service, and after moving, additionally receives the dedicated channel service.

As described above, in the conventional art, the terminal having set a dedicated channel in the SRNC may move to another region and then, if a connection between the terminal and the DRNC that can support the MBMS service is set, when a dedicated channel for receiving MBMS service information is set in the DRNC, the DRNC could not support the selection with respect to the setup (establishment) and release of the channel for the service that the terminal desires to receive according to the capability of the terminal. As a result, the terminal can not receive information of its desirable service, and thus it is impossible to receive an ongoing service.

Therefore, in the present invention, in order to allow the terminal, which can not receive two channels (i.e., does not have sufficient capability), to select its desirable service, as the RNC to which the terminal has moved notifies the terminal that the MBMS service can be supported, the terminal can set and release a channel according to its selection, so that it is possible to solve the problems in which the terminal can not receive information of its desirable service and thus can not receive the service.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A radio communication system for a multimedia broadcast and multicast service (MBMS), the system comprising:
a terminal receiving data from a first Radio Network Controller (RNC) through a first dedicated channel, wherein the terminal cannot simultaneously receive the first dedicated channel and a second dedicated channel due to a lack of capabilities; and
a second Radio Network Controller (RNC) for providing information of the MBMS to the first RNC, which supports a service that is not the MBMS, when the terminal receiving the service that is not the MBMS from the first RNC moves to an area in which the second RNC supports the MBMS,
wherein the first RNC receives the information of the MBMS and provides the information of the MBMS to the terminal,
wherein the information of the MBMS indicates every service that the second RNC can support, a specific service to which the terminal has subscribed, and whether the specific service is available,
wherein the second RNC informs both the first RNC and the terminal that a setup of both the first dedicated channel and the second dedicated channel for the specific service is possible, and
wherein the terminal can set or release its desirable radio link based on the information of the MBMS received from the first RNC.

2. The system of claim 1, wherein the first RNC is a Serving RNC (SRNC).

3. The system of claim 1, wherein the second RNC is a Drift RNC (DRNC).

4. The system of claim 1, wherein the information of the MBMS comprises one of a service ID and a list of service IDs.

5. The system of claim 1, wherein the second RNC can transfer the information of the MBMS directly to the terminal through an MBMS control channel (MCCH).

6. The system of claim 1, wherein the first RNC notifies the terminal of the information of the MBMS through a service notification message.

7. The system of claim 1, wherein the information of the MBMS is transferred to the first RNC through a service indication message.

8. The system of claim 7, wherein the service indication message comprises one of a radio link setup/reconfigure response message and an attach response message.

9. A method of providing a multimedia broadcast and multicast service (MBMS), the method comprising:

transmitting information related to MBMS services from a drift radio network controller (DRNC) to a source radio network controller (SRNC) that does not support the MBMS; and     transmitting, through an MBMS control channel (MCCH), the information related to MBMS services from the DRNC to a terminal moving to an area in which the DRNC supports the MBMS,     wherein the terminal cannot simultaneously receive the MCCH and a dedicated control channel (DCCH) due to a lack of capabilities, and the terminal can set or release its desirable radio link based on the information received from the DRNC,     wherein the information related to MBMS services indicates every service supported by the DRNC, a specific service to which the terminal has subscribed, and whether the specific service is available, and     wherein the DRNC informs both the SRNC and the terminal that a setup of both the DCCH and the MCCH for the specific service is possible.

10. The method of claim 9, wherein the information related to MBMS services has been received by the DRNC from the SRNC.

\* \* \* \* \*